United States Patent Office 3,544,870
Patented Dec. 1, 1970

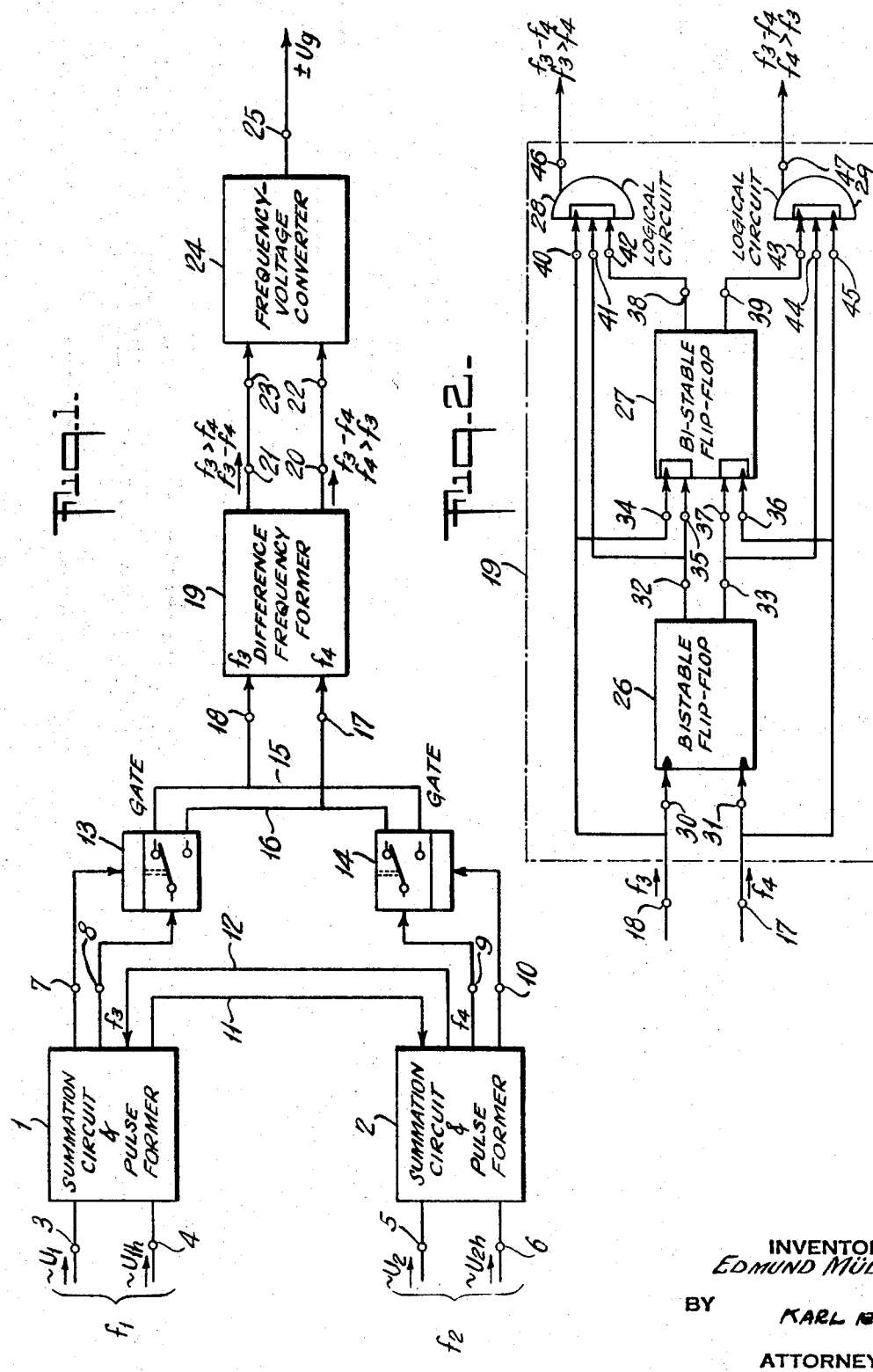

3,544,870
MEANS FOR AND METHOD OF DETERMINING THE DIFFERENCE BETWEEN THE STATOR AND ROTOR FREQUENCIES OF ASYNCHRONOUS MACHINES
Edmund Müller, Weinheim, Germany, assignor to Brown, Boveri & Company Ltd., Baden, Switzerland
Filed Aug. 23, 1968, Ser. No. 754,851
Claims priority, application Germany, Sept. 30, 1967, 1,591,852
Int. Cl. H02p 1/44
U.S. Cl. 318—227          5 Claims

ABSTRACT OF THE DISCLOSURE

A first and second alternating current voltage varying in frequency, respectively, in proportion to the speeds of rotation of the stator field and the rotor of an asynchronous electric machine and having different time phase positions upon the stator field rotating in clockwise or anticlockwise direction, respectively, are converted into a pair of pulse trains of mutually exclusive time positions and of twice the frequency of the respective alternating voltages. The pulse trains are applied, via synchronous switching gates to the inputs of a difference frequency former with said gates being controlled selectively by pulses derived from the respective trains, to cause the latter to be applied separately to the respective inputs of the difference frequency former if the stator field and rotor rotate in the same direction, and to cause said trains to be combinedly applied to either of said inputs if the stator field and rotor rotate in opposite directions.

The difference frequency former has two outputs supplying either the sum or difference frequency of said trains and is connected to a common frequency-to-voltage converter producing a D.C. output signal proportional to said difference frequency and representing both in sign and amplitude the relative slip between the stator rotary field and rotor of the asynchronous machine.

---

The present invention relates to apparatus for and a method of determining or measuring the difference or slip frequency between the frequencies of the rotary stator field and rotor of an asynchronous machine, proportional to the speeds of rotation of said field and rotor, respectively.

In the use of three-phase asynchronous or squirrel-cage electic motors of high controllability, it is frequently necessary to produce a sensing or control signal voltage proportional to the slip frequency or difference between the stator field and rotor speeds or frequencies, for indication and/or control purposes.

Various methods and means have heretofore been proposed for the determination or measurement of the slip frequency of asynchronous electric machines.

According to a well known arrangement, the slip frequency measurement involves the formation of the difference between a first auxiliary D.C. voltage proportional to the speed of rotation of the stator field, being in synchronism with the frequency of the A.C. power source or network feeding the machine, and of a second auxiliary D.C. voltage proportional to the actual speed of rotation of the machine. The last-mentioned auxiliary voltage may be produced by a tachometer-type auxiliary generator having a permanent magnetic stator field and being driven by the output or rotor shaft of the asynchronous machine, such as described in and shown by German Pat. 1,093,893. The first-mentioned auxiliary D.C. voltage being proportional to the speed of the rotary stator field may be simply derived, by means of a counter-type or equivalent frequency converter, from the A.C. network or power source feeding the machine. In producing the auxiliary D.C. voltages, proportionality factors must be properly coordinated or equalized, to result in a difference D.C. voltage directly proportional to the relative slip between the stator field and rotor, respectively.

Methods of the foregoing and similar type of determining or measuring the slip frequency of asynchronous machines have the inherent disadvantage of a relatively low measuring accuracy in that the magnitude representing the slip is derived as the difference between a pair of D.C. voltages of magnitude differing by slight amounts only, whereby to in turn result in a relatively small difference voltage.

Another disadvantage of the prior devices and methods is their limitation to conditions of operations of the machine where the slip has a positive value, that is, with the rotor speed lagging behind and being in the same direction as the stator field rotation.

Accordingly, an important object of the present invention is the provision of improved apparatus for and a method of determining or measuring the slip frequency of an asynchronous machine by which the foregoing and related difficulties inherent in the prior arrangements are substantially overcome.

A more specific object of the invention is to provide improved measuring apparatus for and a method of producing a D.C. output signal indicative of both a positive and negative slip between the rotor and stator speeds of an asynchronous machine, that is, taking into account such operating conditions as involving a slip greater than one, as well asynchronous braking or power regeneration with the rotor rotating in a direction opposite to the rotation of the stator field.

The invention, both as to the foregoing and ancillary objects as well as novel aspects thereof, will be better understood from the following detailed description, taken in conjunction with the accompanying drawing forming part of the specification and in which:

FIG. 1 is a basic block diagram of a slip frequency measuring system constructed in accordance with the principles of the invention; and FIG. 2 shows in greater detail the frequency difference former forming part of FIG. 1.

Like reference numerals denote like parts in both views of the drawing.

With the foregoing objects in view, the invention involves generally the provision or utilization of a pair of auxiliary A.C. voltages having a frequency equal or proportional to, respectively, the speed of rotation or frequency of the stator rotary field and of the rotor of the machine, the difference between the frequencies of said voltages representing in a known manner the relative slip between the stator field and rotor which may be either positive during normal operation or negative during the special operating conditions mentioned, such as during regenerative braking or asynchronous power regeneration. In order to take into account, in the final indication, the direction of rotation of the stator field, that is, either clockwise or anticlockwise, the time-phase positions of said voltages are adjusted by adding thereto a quadrature component of like frequency, or a component displaced by ±90° from the respective main A.C. voltages, the displacement being in one sense in the case of rotation of the stator field in one (clockwise) direction and the displacement being in the opposite sense in the case of rotation of the stator field in the opposite (anticlockwise), direction, respectively. The resultant composite A.C. voltages are converted into pulse trains of mutually exclusive time positions and of twice the frequency, said trains being in turn applied, by way of a pair of two-pole synchronous switching gates operated in step or opposition respectively depending on whether the rotor moves in the same or opposite direction relative to the stator field, to a special frequency difference former having a pair of inputs and a pair of outputs. The gates are controlled by pulses derived from the respective pulse trains and are connected to the inputs of the difference frequency former, in such a manner as to alternately and separately apply the pulses to the respective inputs of the difference frequency former, if the rotor rotates in the same direction as the stator field, on the one hand, and to combinedly apply the pulses to a single input of the difference frequency former only, if the rotor rotates in a direction opposite to the rotation of the stator field, on the other hand.

The difference frequency former is so designed, as described in greater detail in the following, that there is produced a pulse difference frequency in either of its outputs, depending on which of the input pulse trains has the greater recurrence fequency, respectively, whereby, upon conversion of the resultant difference frequencies by a common frequency-to-voltage converter, the latter supplies a D.C. voltage output signal proportional as to both magnitude and sign to the slip between the rotor and stator speeds of the asynchronous machine, in a manner as will become further apparent as the description proceeds.

The frequency difference former preferably comprises a pair of bistable flip-flop circuits and two output logical (AND) circuits, the first flop-flop circuit having two set-inputs and two outputs, the second flip-flop circuit having to set-inputs, two auxiliary inputs and two outputs, and the logical circuits each having two auxiliary inputs, one set-input and an output. One of the inputs of the first flip-flop circuit, to which is applied, respectively, a single or both pulse trains, is connected both to the set-input of the first logical circuit and to the set-input of the second flip-flop circuit. In a similar manner, the remaining input of the first flip-flop circuit, to which is applied, respectively, the other of said pulse trains or both said trains, is connected both to the set-input of the second flip-flop circuit and to the set-input of the second logical circuit, while the outputs of the first flip-flop circuit are connected each to one of the auxiliary inputs of the second flip-flop circuit and to one of the auxiilary inputs of the logical circuits, respectively. Finally, the remaining auxiliary inputs of the logical circuits are connected each to one of the outputs of the second flip-flop circuits.

As a consequence, there are produced in the outputs of the logical circuits difference and sum frequency pulses, respectively, whereby to in turn result in both positive and negative slip frequency signals or voltages in the output of the frequency-to-voltage converter energized by the outputs, in the manner as will become further apparent as the description proceeds in reference to the drawing.

Referring more particularly to FIG. 1, showing a basic diagram of the slip frequency measuring system according to the invention, blocks 1 and 2 denote summation and pulse-forming devices or circuits each having two inputs 3, 4 and 5, 6 and a pair of outputs 7, 8 and 9, 10, respectively. Both devices 1 and 2 are mutually interconnected or coupled through lines 11 and 12 the purpose of which will be described hereafter. The outputs 8 and 9 are connected each to the input of one of a pair of two-pole gates or synchronous switching devices 13 and 14, respectively, and the outputs 7 and 10 are connected to the respective control electrodes of said gates. The non-coordinated output terminals of the gates 13 and 14 are connected in parallel through a pair of lines 15 and 16, respectively, of which line 15 is connected to the input 18 and line 16 is connected to the input 17 of a difference frequency former 19. The latter has two outputs 20 and 21 which are connected, respectively, to the inputs 22 and 23 of a common frequency-to-voltage converter 24 having an output 25.

Applied to the device 1 are a pair of A.C. voltages $U_1$ and $U_{1h}$ the frequency $f_1$ of which is either equal to the speed or frequency $f_{st}$ of the stator or voltage feeding the asynchronous motor (rotary field frequency) or to a frequency differing therefrom by a constant proportionality factor K.

Both voltages $U_1$ and $U_{1h}$ of which $U_1$ may be the "main" stator voltage and $U_{1h}$ constitutes an "auxiliary" stator voltage, are relatively displaced in phase by an angle of $\pm 90°$, the sign of the displacement depending on whether the stator field rotates in one (clockwise) or in the opposite (anticlockwise) direction. In practice, the auxiliary or quadrature voltage $U_{1h}$ may be derived from and added to the main voltage $U_1$, by suitable circuit means including a change-over switch, in either leading of lagging relation thereto, depending upon the sense of rotation of the stator field.

Applied in a similar manner to the device 2 are a pair of main and auxiliary voltages $U_2$ and $U_{2h}$ the frequency $f_2$ of which is either equal to the frequency $f_n$ corresponding to the rotor speed, that is, a frequency differing from the stator or synchronous frequency by a difference proportional to the relative slip between the stator field and rotor speeds, or differing therefrom by a whole number proportionality factor K, respectively. Again, both voltages $U_2$ and $U_{2h}$ are relatively displaced in phase by $\pm 90°$ depending on the sense of rotation of the stator field, in the manner similar to the voltages $U_1$ and $U_{1h}$. As a consequence, the final slip frequency measurement takes into account the sense of rotation of the machine, in a manner as will be further understood from the following.

The output voltages $U_1$ and $U_2$ whose time phase positions depend on the sense of rotation of the stator field are converted, with the aid of suitable pulse-shaping means, into pulse trains of twice the frequency, that is, $2Kf_{st}$ and $2Kf_n$, respectively, wherein, K=1, 2, 3 . . . and K represents a proportionality factor. Both pulse voltages $U_1$ and $U_2$ are mutually interlocked through suitable time delays or circuits 11 and 12, to prevent a coincidence of a pulse of one train with a pulse of the other train, or to cause the pulses of one train to alternate with the pulses of the other train in mutually exclusive relative time phase position therebetween.

Assuming that both the stator field and rotor of the asynchronous machine rotate in the same direction, that is, either in a clockwise or anticlockwise direction, the devices 1 and 2 will apply, via outputs 7 and 10, control pulses derived from the main signal pulses or voltages $U_1$ and $U_2$ to the gates 13 and 14, whereby to operate said gates either in step, as shown in the drawing, or in phase opposition, depending upon whether both stator field and rotor rotate in the same or in opposite directions, respectively. As a consequence, the pulse voltages $U_1$ and $U_2$ of double frequency are applied separately or each to one of the inputs 17 and 18 of the difference frequency former 19 in the case of like sense of rotation of the stator field and rotor of the machine. On the other hand, if the direction of rotation of the rotor in opposite to the direction of rotation of the stator field, switching of the gates 13 and 14 will be such as to casue both pulse voltages $U_1$ and $U_2$ to be combinedly applied to the respective input of the difference frequency former 19, that is, either input 17 or 18, respectively.

The doubling to the frequencies $Kf_{st}$ and $Kf_n$ serves for the purpose of preventing errors in the slip frequency being measured. Thus, where the phase comparison of the pulse voltages $U_1$ and $U_2$ is effected every 360°, as where no frequency doubling is employed, it may happen that, with the frequency of both voltages being equal to zero, the harmonics contained in $U_1$ may operate in the same manner as the fundamental, whereby the gate 13 will remain in the position shown in the drawing, to result in the application of the harmonic to the input 18 of the difference frequency former 19. If, on the other hand, the phase comparison is effected every 180° as in the case of frequency doubling, additional signals resulting from the harmonics in both devices 1 and 2 will be applied to both lines 7 and 10 and cause switching of the gates 13 and 14 in the rhythm of the operating frequency. As a consequence, the pulses resulting from the harmonics appear alternately at the inputs 17 and 18 of the difference frequency former 19, and inasmuch as both said inputs are derived from the same frequency, the resulting error will be cancelled out in the output of the device.

Both devices 1 and 2 are coupled with one another in such a manner that the pulses in their outputs never coincide or remain displaced in time. This precaution which may be achieved by a mutual interlocking of the devices and relative time delay of the pulses through lines 11 and 12 is necessary in order to prevent overlapping of two outgoing pulses of the devces 1 and 2 or simultaneous application to the difference frequency former 19 which would result in measuring errors.

More particularly, assuming the stator field and rotor to rotate in the same direction, the pulse frequencies $2Kf_{st}$ and $2Kf_n$ are applied to different inputs of the difference frequency former 19, subtracted from one another in the latter, in the manner described in the following, and thereafter applied to the voltage-to-frequency converter 24. The latter delivers at its output 25 a D.C. voltage or signal which is proportional to the difference frequency, being either positive or negative depending on whether the applied pulses appear at its input 22 or 23, or at the outputs 20 and 21, respectively, of the device 19. More particularly, since the difference pulse frequency $f=2Kf_{st}-2Kf_n=f_3-f_4$ is proportional to the relative frequency by which the stator field overruns the rotor, there is obtained at the output 25 of the device 24 a D.C. voltage or signal $\pm U_g$ proportional to the slip frequency $f=c(f_{st}-f_n)$.

On the other hand, if the direction of rotation of the rotor is opposite to the direction of rotation of the stator field, the outgoing pulses of the devices 1 and 2 are applied, via the gates 13 and 14, to only one of the inputs 17 and 18 of the difference frequency former 19, whereby to pass through the latter unimpededly and being applied directly to the outputs of the converter 24. In other words, there are applied in this case to the single input of the difference frequency former and, in turn, to the inputs of the frequency-to-voltage converter, the combined frequencies $2Kf_{st}=f_3$ and $2Kf_n=f_4$, that is, a frequency $f=2K(f_{st}+f_n)$ or $f_3+f_4$, the latter again representing the relative frequency between stator field and rotor, or slip frequency under the assumed operating condition. The difference frequency pulses are again converted in the device 25 into positive and negative D.C. signal or voltages representing the relative slip in both sign and magnitudes.

The following table represents a summary of all the possible operating conditions and relationships between the directions of rotation, rotor and stator frequencies and polarity of the final output signals or relative slip between rotor and stator obtainable with the aid of measuring apparatus according to the invention.

| Direction of rotation of stator field | Direction of rotation of rotor | Frequency relation of pulse voltages | Polarity of d.c. output voltage |
|---|---|---|---|
| Clockwise | Anticlockwise | $f_{st} \lessgtr f_n$ | Positive. |
| Do | Clockwise | $f_{st} > f_n$ | Do. |
| Do | do | $f_{st} < f_n$ | Negative |
| Anticlockwise | Anticlockwise | $f_{st} > f_n$ | Do. |
| Do | do | $f_{st} < f_n$ | Positive. |
| Do | Clockwise | $f_{st} \lessgtr f_n$ | Negative |

The drawing indicates that either output of the difference frequency former 19 is applied to its associated input of the frequency-to-voltage converter 24, depending on whether $f_3$ exceeds $f_4$ or $f_4$ exceeds $f_3$, respectively, to result in either a positive or negative D.C. output voltage $U_g$ in the common output 25.

In the following will be described in greater detail the construction and operation of the difference frequency former 19. The latter, as more clearly shown in FIG. 2, comprises a pair of bistable flip-flop circuits 26 and 27 and a pair of logical (AND) circuits 28 and 29. Flip-flop circuit 26 has two set-inputs 30 and 31 and two outputs 32 and 33, while flip-flop circuit 27 has four inputs 34, 35, 36, and 37, of which inputs 34 and 36 are set-inputs, and two outputs 38 and 39. The logical circuits 28 and 29 are of like construction, each having three inputs 40, 41, 42, and 43, 44, and 45 and an output 46 and 47, respectively, inputs 40 and 45 being set-inputs and the remaining inputs of the devices acting as auxiliary inputs.

The input 30 of flip-flop 26 is connected both to the set-input 34 of flip-flop 27 and to the set-input 40 of logical circuit 28, while the remaining input 31 of flip-flop 26 is similarly connected both to the set-input 36 of flip-flop 27 and the set-input of logical circuit 29. Furthermore, the output 32 of flip-flop 26 is connected both to the auxiliary input 35 of flip-flop 27 and to the auxiliary input 41 of logical circuit 28, while the output 33 of flip-flop 26 is similarly connected both to the auxiliary input 37 of flip-flop 27 and the auxiliary input 44 of logical circuit 29. Finally, the outputs 38 and 39 of flip-flop 27 are connected to the remaining auxiliary inputs 42 and 43, respectively, of the logical circuits 28 and 29.

Considering the fact that, with the pulse frequencies $f_3$ and $f_4$ applied to the inputs 30 and 31 of the flip-flop circuit 26 differing from one another, such for instance with $f_3$ exceeding $f_4$, an additional pulse will occur and be applied to the input 30 at the rhythm of the difference frequency or at definite time intervals, as compared with the pulses applied to input 31, and considering further that the logical circuits 28 and 29 produce an outgoing pulse at their outputs 46 and 47 only if, prior to the occurrence of a pulse at the inputs 30 and 31, a definite such as an 0-signal occurs at both the auxiliary inputs 41, 42 or 43, 44, respectively, the formation of the difference frequency in the outputs of the logical devices 28 and 29 will be as described in the following.

Prior to the occurrence of the additional pulse at the input 30 of the flip-flop circuit 26, the signals at the outputs 32 and 33 change continuously between 1 and 0, and vice versa, since an 0-signal occurs at each output as soon as a control pulse appears at the respective input. As a consequence, a 1-signal is applied to one of the auxiliary inputs 40 and 44 of the logical circuit at the associated set-inputs of which appears the next following pulse resulting from the alternately applied input pulses at 30 and 31. In other words, with discrete alternate pulses being applied to the inputs 30 and 31, none of the outputs 46 and 47 of the logical circuits 28 and 29 is enabled to deliver an output pulse. On the other hand, let it be assumed that the output 38 carries an 0-signal and that the output 39 carries a 1-signal during a definite pulse interval. If now an additional or excess input pulse occurs as a result of the different frequencies $f_3$ and $f_4$, the excess pulse will now be allowed to pass through the circuit 28, inasmuch as the output 38 has been set to 0 and an additional 0-signal applied to the auxlary input of 28.

The same operation takes place for $f_4$ exceeding $f_3$ in that the bistable flip-flop circuit 27 acts as an information store to which of the voltage pulses applied to the inputs 30 and 31 has the higher frequency. Thus, for $f_4$ exceeding $f_3$, the flip-flop circuit 27 controls the logical circuit 29 by the excess pulse, whereby to allow the latter to pass from 31 to the output 47 of the logical circuit 29, in the same manner as described hereinbefore.

The difference frequency former 19 as shown and described has the further advantage, due to the complete symmetry of the circuit, that high frequency hunting effects of the input pulse trains are substantially suppressed or stabilized. Such hunting may be the result of harmonics contained in the main voltages $U_1$ and $U_2$ or due to inaccuracies in the construction of the auxiliary A.C. generator driven by the machine and producing the rotor frequency $f_n$.

As a consequence, there is produced and provided by the invention a substantially stable pulse difference or sum frequency signal free from undesirable additional fluctuations or interference.

In the foregoing, the invention has been described in reference to a specific exemplary device or embodiment. As will be evident, variations and modifications, as well as the substitution of equivalent parts or devices for those shown and described may be made in accordance with the broader purview and spirit of the invention.

I claim:

1. Apparatus for determining the slip frequency of a multi-phase asynchronous machine comprising in combination:
   (1) means to produce first and second pulse trains having frequencies varying, respectively, in proportion to the stator field and rotor speeds of said machine,
   (2) a pair of two-pole synchronous switching devices each having a control electrode, an input terminal and a pair of output terminals interconnected, to provide a pair of common outputs by said devices,
   (3) means to apply each of said pulse trains to one of said input terminals in mutually exclusive time-coincidence relation to one another,
   (4) means to control said devices each by pulses derived from one of said trains and applied to the respective control electrodes, to produce separate output pulses by said trains in said common outputs in the case of the stator field and rotor rotating in the same direction, and to produce the sum of said pulses in either of said common outputs in the case of the stator field and rotor rotating in opposite directions, respectively,
   (5) a pulse frequency difference former having a pair of inputs each connected to one of said common outputs and having a pair of outputs, to produce difference frequency pulses in and to unimpededly pass the sum frequency pulses to the respective outputs of said difference frequency former, and
   (6) a frequency-to-voltage converter having an output and a pair of inputs each connected to one of the outputs of said difference frequency former, to convert the output pulse trains of said frequency difference former, respectively, into positive and negative D.C. voltages proportional to the corresponding output pulse frequencies,
   (7) whereby to produce a final D.C. signal in the output of said converter proportional in both sign and magnitude to the slip between the rotor and stator fields of said machine.

2. Slip frequency determining apparatus as claimed in claim 1, wherein said first means includes means to produce a pair of A.C. voltages having frequencies proportional, respectively, to the stator field and rotor speeds of said machine, and means to convert said A.C. voltages into corresponding pulse trains.

3. Slip frequency determining apparatus as claimed in claim 1, wherein said first means includes means to produce a pair of A.C. voltages having frequencies proportional, respectively, to the stator field and rotor speeds of said machine, and means to convert said A.C. voltages into pulse trains of twice the recurrence frequencies of the respective A.C. frequencies.

4. Slip frequency determining apparatus as claimed in claim 1, said first means including means to produce a pair of A.C. voltages having frequencies proportional, respectively, to the stator field and rotor speeds of said machine, means to combine said A.C. voltages with quadrature components in leading or lagging relation depending, respectively, upon the sense of rotation of said stator field, and means to convert the combined A.C. voltages into pulse trains of twice the recurrence frequencies of the respective A.C. frequencies.

5. Slip frequency determining apparatus as claimed in claim 1, wherein said pulse frequency difference former comprises a first bistable flip-flop circuit having two set-inputs, forming the inputs of the device, and two outputs, a second bistable flip-flop circuit having two set-inputs, two auxiliary inputs and two outputs, a pair of logical AND circuits each having a set-input, two auxiliary inputs and an output, a pair of first circuit connections each connecting one of the inputs of said first flip-flop circuits both to a set-input of said second flip-flop circuit and the set-input of one of said logical circuits, a pair of second circuit connections each connecting an output of said first flip-flop circuit both to one of the remaining set-inputs of said second flip-flop circuits and an auxiliary input of one of said logical circuits, and a pair of third circuit connections connecting each of the outputs of said second flip-flop circuit to the remaining auxiliary input of one of said logical circuits, whereby to produce a difference frequency output pulse train in either of the outputs of said logical circuits depending on which of the pulse trains applied to said inputs has the relative greater recurrence frequency.

References Cited

UNITED STATES PATENTS

| 3,320,506 | 5/1967 | Humphrey | 318—227 |
| 3,372,323 | 3/1968 | Guyeska | 318—231 |

ORIS L. RADER, Primary Examiner

K. L. CROSSON, Assistant Examiner

U.S. Cl. X.R.

318—231